United States Patent Office 3,549,707
Patented Dec. 22, 1970

1

3,549,707
DIFLUOROAMINO DERIVATIVES
Eugene L. Stogryn, Fords, and Michael H. Gianni, Roselle, N.J., assignors to Esso Research and Engineering Company, a corporation of Delaware
No Drawing. Filed Dec. 17, 1962, Ser. No. 246,869
Int. Cl. C07c 93/02
U.S. Cl. 260—584                         10 Claims This invention relates to the preparation of a new high-energy fluorine oxidizer, hexakis ($NF_2$) dipropyl ether, represented by the following formula:

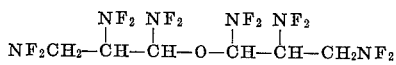

The invention is concerned with a process that involves the reaction of 1,2-divinyl ethylene oxide, both cis and trans, with $N_2F_4$ to form intermediate bis ($NF_2$) and tetrakis ($NF_2$) derivatives of divinyl ethylene oxide, as well as a hexakis ($NF_2$) derivative.

The compound di-[1,2,3-tris-($NF_2$)]n-propyl ether, which is called a hexakis ($NF_2$) dipropyl ether, is satisfactorily made in accordance with the present invention and is of considerable interest in that it contains one $NF_2$ group per carbon atom to give it a high energy value. This oxidizer is superior to other known liquid fluorine oxidizers that contain one $NF_2$ group per carbon atom because of its high thermal stability, very low volatility, ease of preparation and recovery in highly concentrated or pure condition. Other liquid fluorine oxidizers, such as tetrakis ($NF_2$) butane and tetrakis ($NF_2$) furan, which have been made as oxidizer components for solid propellant formulations, have a higher volatility which tends to result in their loss during formulation of a propellant composite. In general, such liquid oxidizers containing $CNF_2$ groups may have drawbacks in their preparation and purification. The presence of impurities in the liquid oxidizers not only lowers their energy value, but tends to contribute significantly to poor stability of the high-energy compounds. Although hexakis ($NF_2$) hexane has a more satisfactory volatility property as compared to the compounds containing fewer carbon atoms per molecule, its preparation and purification entails some difficulties.

The hexakis ($NF_2$) dipropyl ether or di-[1,2,3-tris-($NF_2$)]n-propyl ether can be prepared in excellent yields by a relatively low temperature reaction process in which the product obtained has excellent purity. The hexakis ($NF_2$) dipropyl ether can be attained in a high degree of purity by a simple washing with concentrated sulfuric acid or by a vacuum distillation.

In essence, the process for preparing the new compounds disclosed herein involves the reaction of 1,2-divinyl ethylene oxide, abbreviated as DVEO, either the trans or cis isomers or mixtures of these isomers, with

2

$N_2F_4$ under conditions which permit $NF_2$ groups to become attached to carbon atoms in a resulting linear ether. The reaction occurs in a surprising manner involving a skeletal rearrangement, including the breaking of the carbon-to-carbon bonding in the epoxy group and the shifting of double bonds. The course of the reaction and the nature of the products arising in each stage of reaction has been determined by studies of the reactions occurring for the segregated divinyl ethylene oxide isomers. For instance, the trans isomer was formed and segregated from the cis isomer, and also from an unsaturated heterocyclic compound that tends to be formed by the cis isomer. The following equations depict the course of reaction and indicate the intermediate products, as well as the final difluoraminated product.

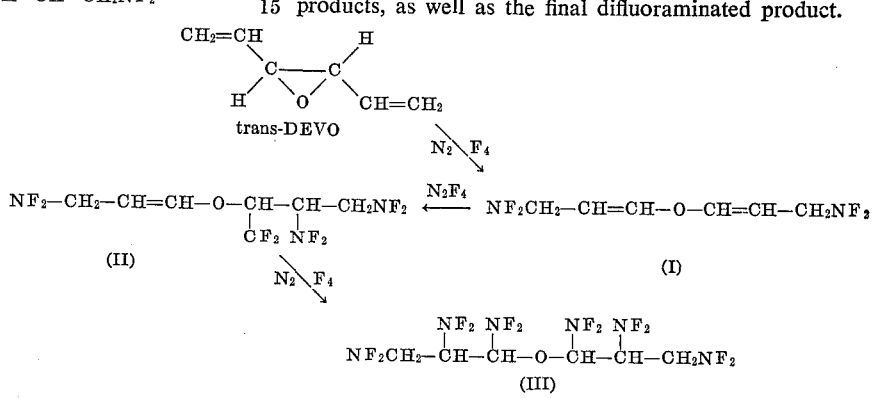

It will be noted that the bis ($NF_2$) derivative (I) and the tetrakis ($NF_2$) Compound (II), which are unsaturated ethers, can be used as intermediate starting materials to prepare the saturated hexakis ($NF_2$) dipropyl ether which is compound (III). Further research and studies showed that the trans isomer, as well as the cis-trans mixtures, of divinyl ethylene oxide can be made to go through the same course of reactions, provided reaction conditions are controlled to prevent a rearrangement of the cis isomer to a 7-membered cyclic unsaturated ether, insofar as it is desirable to obtain the hexakis ($NF_2$) propyl ether having one $NF_2$ group per carbon atom.

Although other methods may be devised for preparing the divinyl ethylene oxide (DVEO) isomers, a preferred method employs low reaction temperatures thereby preventing formation of a 7-membered unsaturated cyclic ether, the presence of which complicates the reaction with $N_2F_4$ to obtain the desired difluoramino compounds. The preparation of DVEO is the subject matter of the invention in S.N. 245,645, filed Dec. 19, 1962, now U.S. Pat. No. 3,261,848, for Eugene L. Stogryn and Anthony J. Passannante and which is a continuation-in-part of their application S.N. 219,368 filed Aug. 22, 1962, now U.S. Pat. No. 3,261,819.

In the preferred method of preparing DVEO, a chloroester, $CH_2{:}CH \cdot CHCl \cdot CH(OOCH_3) \cdot CH{:}CH_2$, is obtained from divinyl ethylene glycol,

and the chloroester is reacted with caustic under controlled temperature and pressure conditions in a reaction zone from which the divinyl ethylene oxide product is distilled with water as it is formed in the reaction zone. The DVEO product is separated from the distillate by extraction with diethyl ether, the ether solution then being dried by magnesium sulfate and the diethyl ether then being separated by distillation from the DVEO product.

The preferred reaction steps for preparing the DVEO are shown in the following equation:

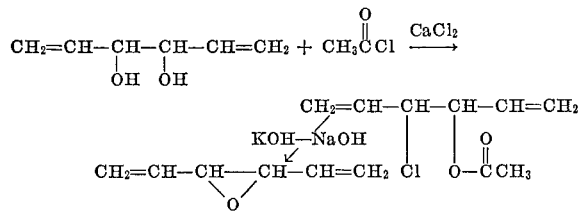

The DVEO product contains principally the trans isomer, particularly when the second step, reaction of the chloroester with caustic, is performed at a lower temperature level. If the reaction mixture is maintained at a low temperature of about 50° C. so that the overhead vapor temperature of the product being distilled from the reaction zone is in the range of about 38° to 40° C., the DVEO product will contain 80% of the desired DVEO trans isomer free of the 7-membered unsaturated cyclic ether. On the other hand, if this reaction is carried out at higher temperatures, e.g. in the range of about 80° to 200° C., less of the trans isomer is isolated, together with more of the heterocyclic derivative which has the structure and composition of 4,5-dihydrooxepine, which term corresponds to the nomenclature used in "The Ring Nucleus" by A. M. Patterson and L. T. Copell, ACS Monograph (1940), page 8. The formation of the cyclic from the cis isomer is represented by the equation:

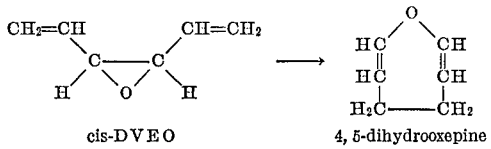

It will be noted that the oxepine thus formed can only add four $NF_2$ groups in a reaction with $N_2F_4$, producing 2,3,6,7-tetrakis ($NF_2$) oxepane, which has a relatively lower energy value as compared to a compound containing six $NF_2$ groups per six carbon atoms.

EXAMPLE 1

Preparation of 1,2-divinyl ethylene oxide

To a rapidly stirred suspension of 3,4-dihydroxy 1,5-hexadiene, $H_2C:CH \cdot CHOH \cdot CHOH \cdot CH:CH_2$, 228 grams, and 41.6 grams of calcium chloride was added 190 grams of acetyl chloride over a period of 45 minutes. During the course of addition, the reaction mixture was maintained at a temperature between 0° and 10° C. The stirred mixture was slowly brought to room temperature and stirring was continued for 24 to 48 hours. At the end, the reaction mixture was warmed to 50° C. for 1 hour. The reaction mixture was then poured into ice and extracted with ether. The ether layer was neutralized with a saturated solution of sodium bicarbonate. The ether layer was dried over anhydrous potassium carbonate, filtered, and the ether removed by distillation. In this fashion there was obtained 269 grams of the crude chloroester, 3-chloro 4-acetoxy 1,5-hexadiene,

In a 1-liter 4-neck flask fitted with a stirrer, dropping funnel, distillation head, and a condenser and a receiver, there was placed 362 grams of sodium hydroxide pellets, 362 grams of potassium hydroxide pellets and 36.2 grams of water, together with sufficient white oil to permit facile agitation of this mixture. This flask was placed in the sand bath and the bath heated to 170° C. At this temperature, 257 grams of crude 3-chloro 4-acetoxy 1,5-hexadiene was dripped in slowly. The pressure in this apparatus was reduced so that an overhead temperature of 90° to 100° C. was maintained. In this fashion, there was collected in the distillation receiver a mixture of water and crude trans-1,2-divinyl ethylene oxide and 4,5-dihydro-oxepine. The epoxide/oxepine mixture thus prepared was separated from the water by extraction with diethyl ether; the ether solution was then dried over magnesium sulfate and distilled at atmospheric pressure. The fraction boiling at 108° to 112° C. weighed 48.5 grams. A distillation cut of the final product having a boiling point of 110° to 112° C. under 771 mm. Hg abs. pressure gave the elemental analysis corresponding to $C_6H_8O$.

The reaction product containing a mixture of trans DVEO and the heterocyclic compound dihydrooxepine impurity can be treated to remove the heterocyclic compound by use of selective absorption, adsorption, liquid extraction or chromatography methods. Separation of the heterocyclic compound by distillation is somewhat difficult. On the other hand, if a higher energy oxidizer product is not required, the crude mixture of the isomers, together with the heterocyclic compound, may be reacted with $N_2F_4$ to obtain a difluoraminated product.

An alternate technique for preparing DVEO, uncontaminated with 4,5-dihydrooxepine, is described below.

Using the same quantities of reactants as previously described except 700 ml. of ethylene glycol is employed as the diluent. The temperature in the reaction zone is maintained in the range of 40° to 50° C. and the pressure is such that an overhead temperature of the distillate is 38° to 40° C. In this manner, product recovered is comprised of cis/trans DVEO in a ratio of 1:7, free of 4,5-dihydrooxepine.

The following examples illustrate the sequence of reactions that can be followed in the reaction of the DVEO products in the production of the $CNF_2$ derivatives.

EXAMPLE 2

Preparation of di-(1-$NF_2$)n-propenyl ether, compound (I)

Trans 1,2-divinyl ethylene oxide, 5 mmoles in 2 ml. of carbon tetrachloride, was placed in a 6 ml. capacity stainless steel reactor. After degassing the carbon tetrachloride solution, 6 mmoles of $N_2F_4$ was introduced into the reactor. The temperature was raised to 80° C. and held there for 2 hours.

At the end of this time, the volatile gases were removed, the carbon tetrachloride solution was removed from the bomb, and the carbon tetrachloride was blown off by a stream of nitrogen. In this manner, there was obtained di-(1-$NF_2$) n-propenyl ether as a water-white distillable liquid. The infrared and the NMR spectra of this material are in good agreement with structure (I).

Calculated for $C_6H_8ON_2F_4$ (percent): C, 36.1; N, 14.0; F, 38.0. Found (percent): C, 34.68; N, 14.29; F, 37.8.

EXAMPLE 3

Preparation of 1,2,3-tris-($NF_2$)n-propyl 1-($NF_2$)-propenyl ether, compound (II)

Reaction and work-up for the preparation of compound (II) were as described in Example 2. Thus, trans DVEO, 3 mmoles, in 2 ml. of $CCl_4$ when reacted with 10 mmoles of $N_2F_4$ for 4 hours at 100° C. yielded compound (II) as a distillable liquid whose infrared and NMR spectra are in agreement with the structure (II).

Calculated for $C_6H_8ON_4F_8$ (percent): N, 18.4; F, 49.9. Found (percent): N, 17.3; F, 47.8.

EXAMPLE 4

Di-[1,2,3-tris-($NF_2$)]n-propyl ether, compound (III)

A 2 ml. carbon tetrachloride solution of 2 mmoles of di-(1-$NF_2$) propenyl ether was placed in a 6 ml. capacity stainless steel reactor and degassed. After degassing, 10 mmoles of $N_2F_4$ were condensed into the reactor. The temperature was raised to 120° C. and held there for 7 hours.

At the end of this time, the noncondensable gases were removed and the carbon tetrachloride was blown off with a stream of nitrogen. There was obtained 0.78 gram of water-white liquid, distillable in a short-path still between 60° and 70° C. at 0.005 mm. Hg. The infrared spectra and the proton and fluorine NMR are in excellent agreement with the structure di-[1,2,3-tris($NF_2$)]n-propyl ether, compound (III).

Calculated for $C_6H_8ON_6F_{12}$ (percent): C, 17.65; N, 20.6; F, 55.6 (M.W. 408). Found (percent): C, 18.51; N, 19.8; F, 52.1 (M.W. 396).

EXAMPLE 5

Di-[1,2,3-tris-($NF_2$)]n-propyl ether, compound (III)

Trans 1,2-divinyl ethylene oxide, 2.6 mmoles, was dissolved in 2 ml. of carbon tetrachloride and introduced into a stainless steel reactor of 6 ml. capacity. The solution was degassed and 3.6 mmoles of $N_2F_4$ were condensed into the reactor. The temperature was raised to 80° C. and held there for 2 hours. The reactor was cooled and noncondensable gases were removed and the excess $N_2F_4$ was condensed out. The bomb was then repressured with a total of 10 mmoles of $N_2F_4$ and heated at 120° C. for 7 hours.

After removal of all noncondensable and condensable gases, the carbon tetrachloride solution was removed from the bomb and the carbon tetrachloride was blown off with a stream of nitrogen. There was obtained 1.04 grams of crude product. A gas chromatographic analysis of the crude product showed it to contain only a trace of carbon tetrachloride and was of 90+% pure.

Calculated for $C_6H_8ON_6F_{12}$ (percent): C, 17.65; N, 20.6; F, 55.6. Found (percent): C, 19.21; N, 19.75; F, 53.6.

The above adduct was purified by a simple sulfuric acid treatment, as described below. 0.7 gram of the crude hexakis ($NF_2$) dipropyl ether was dissolved in 3 ml. of carbon tetrachloride and treated with 20 drops of concentrated $H_2SO_4$. This suspension was rapidly stirred for about 15 minutes. The carbon tetrachloride solution was separated from the sulfuric acid, washed with water, and dried over magnesium sulfate. After removal of the carbon tetrachloride, the following analyses were obtained (percent): C, 18.48; N, 20.35; F, 54.8.

EXAMPLE 6

Preparation of di[1,2,3-tris-1($NF_2$)]n-propyl ether, compound (III)

All the previous examples given for the preparation of compounds (I), (II) and (III) used DVEO in trans configuration. However, all three of these compounds are preparable from a mixture of cis/trans DVEO. The following example will serve to illustrate (1) under initially mild reaction temperatures, a cis/trans DVEO mixture yields compound (III) uncontaminated with the tetrakis ($NF_2$) adduct of 4,5-dihydrooxepine, and (2) the mild reaction conditions permit facile scale-up of the reaction.

A suitable pressure reactor was charged with a solution of 9 ml. of a cis/trans DVEO mixture in 120 ml. of $CCl_4$. Sodium fluoride, 0.2 g., was introduced into the reactor as a buffer against destruction of DVEO or products arising from it as a result of any HF formed during the reaction. After degassing the thus charged reactor, 60 g. of $N_2F_4$ was condensed in a —190° C. The temperature was then raised to 80° C. and held there for 5 hrs. After an additional 7 hrs. at 120° C., the bomb was cooled and the product isolated, as described in previous examples.

Chemical and instrumental analyses indicated that the crude product was essentially compound (III), free of 2,3,6,7-tetrakis-($NF_2$) oxepane. Purification of crude compound (III) obtained in this example could be accomplished by sulfuric acid wash or distillation or both.

In general, for a first stage preparation of compound (I) from DVEO, cis or trans, or mixtures thereof, the reaction temperature is maintained in the range of about 50° to 100° C. For preparation of compounds (II) and (III), the DVEO reactant or the compound (I) product is reacted with $N_2F_4$ at about 100° to 150° C. Compound (III) is obtained satisfactorily by reacting trans DVEO with $N_2F_4$ at elevated temperatures of about 100° to 150° C. or higher.

The mild reaction conditions for synthesis of the hexakis ($NF_2$) dipropyl ether has permitted successful scaling up of its production.

Although the hexakis ($NF_2$) ether product is best for use in obtaining high-energy composites, the crude mixtures which may contain some of compound (II) having the composition $C_6H_8ON_4F_8$ with compound (III) having the composition $C_6H_8ON_6F_{12}$ may be used as liquid oxidizer and plasticizer with solid high-energy polymer binders, with oxygen oxidizers, and with fuels such as powdered metal, e.g. boron, aluminum, beryllium, magnesium and lithium, and their hydrides. Among the known oxidizers that may be used are ammonium perchlorate, hydrazine perchlorate, hydrazine nitroformate, lithium perchlorate, hexanitroethane, nitronium perchlorate, and various others. Suitable high-energy binders are $NF_2$ adducts of unsaturated hydrocarbon polymers, of polyethers, of polyacrylates, and of polyurethanes and the like. Typical formulations and their determined energy values are shown in the following table:

(A)

| | Percent |
|---|---|
| TAA | 20 |
| Hexakis ($NF_2$) dipropyl ether | 40 |
| Boron powder | 3 |
| Hydrazine nitroformate | 37 |
| 287 Isp. | |

(B)

| | Percent |
|---|---|
| TAA | 20 |
| Hexakis ($NF_2$) dipropyl ether | 35 |
| Boron powder | 5 |
| Nitronium perchlorate | 40 |
| 300 Isp. | |

In the composites shown, the binder TAA signifies a tetrakis ($NF_2$) amyl acrylate binder or equivalent binder having an $NF_2$ content of 60 wt. percent, the binder being 20 wt. percent of the composite.

The invention described is claimed as follows:

1. Difluoroamino derivatives of divinyl ethylene oxide selected from the group consisting of di-(1-$NF_2$)n-propenyl ether, 1,2,3-tris-($NF_2$)n-propyl 1-($NF_2$)n-propenyl ether, di-[1,2,3-tris-($NF_2$)]n-propyl ether and mixtures thereof.

2. Di-(1-$NF_2$)n-propenyl ether having the formula:

$$NF_2CH_2—CH=CH—O—CH=CH—CH_2NF_2$$

3. 1,2,3-tris-($NF_2$)n-propyl 1-($NF_2$)n-propenyl ether having the formula:

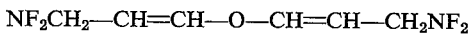

4. Di-[1,2,3 - tris - ($NF_2$)]n - propyl ether having the formula:

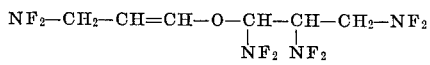

5. Process for forming di(1-$NF_2$)n-propenyl ether which comprises reacting divinyl ethylene oxide with $N_2F_4$ at a reaction temperature in the range of 50° to 100° C., and recovering as resulting product di-(1-$NF_2$)n-propenyl ether.

6. Process for preparing 1,2,3 - tris - ($NF_2$)n-propyl 1-($NF_2$)n-propenyl ether which comprises reacting divinyl ethylene oxide with $N_2F_4$ at a reaction temperature in the range of 100° to 150° C., and recovering the resulting product 1,2,3-tris-($NF_2$)n - propyl 1-($NF_2$)n-propenyl ether.

7. Process for preparing 1,2,3 - tris - (NF$_2$)n - propyl 1-(NF$_2$)n-propenyl ether which comprises reacting di-(1-NF$_2$)n-propenyl ether with N$_2$F$_4$ at a reaction temperature in the range of 100° to 150° C., and recovering the resulting product 1,2,3-tris-(NF$_2$)n-propyl 1-(NF$_2$)n-propenyl ether.

8. Process for preparing hexakis (NF$_2$) dipropyl ether which comprises reacting trans divinyl ethylene oxide with N$_2$F$_4$ at temperatures in the range of about 100° to 150° C., and recovering hexakis (NF$_2$) propyl ether as product.

9. The method of claim 8 in which the trans divinyl ethylene oxide is reacted with an excess of N$_2$F$_4$ in a diluent until the resulting hexakis (NF$_2$) dipropyl ether is formed, washing the resulting solution of the product with concentrated sulfuric acid and with water to remove unsaturated impurities, and then drying the washed hexakis (NF$_2$) dipropyl ether product.

10. The process for producing hexakis (NF$_2$) dipropyl ether which comprises reacting a mixture of cis and trans divinyl ethylene oxide with excess N$_2$F$_4$ at a temperature in the range of 50° to 100° C. to form di-(1-NF$_2$)n-propenyl ether as product and reacting said product with N$_2$F$_4$ in excess at above 100° C. to form hexakis (NF$_2$) dipropyl ether, and recovering the hexakis (NF$_2$) propyl ether.

References Cited

Hoffman et al., Chem. Reviews, vol. 62, pp. 12 to 18 (1962).

LELAND A. SEBASTIAN, Primary Examiner

U.S. Cl. X.R.

149—19, 22, 36, 38, 42, 43, 109